United States Patent [19]

Jerry

[11] 4,123,004
[45] Oct. 31, 1978

[54] CAR HAND SPRAY WASHER

[76] Inventor: Frederick L. Jerry, 13971 Mubbell St., Detroit, Mich. 48227

[21] Appl. No.: 701,354

[22] Filed: Jun. 24, 1976

[51] Int. Cl.² .............................................. B05B 7/30
[52] U.S. Cl. ..................................... 239/310; 251/325
[58] Field of Search ....................... 239/310, 315, 316; 251/325; 137/604

[56] References Cited

U.S. PATENT DOCUMENTS

| 2,795,460 | 6/1957 | Bletcher et al. | 239/315 |
| 2,797,132 | 6/1957 | Alpert | 239/315X |
| 3,039,492 | 6/1962 | Brucker | 239/315 X |
| 3,042,312 | 7/1962 | Packard | 239/315 |

Primary Examiner—Robert W. Saifer

[57] ABSTRACT

A device for mixing a cleaning agent such as soap or a detergent with a stream of water flowing thru the wand of a hand held spray wand for washing cars. A container is mounted on a valve member which, in turn, is mounted on a car washing wand. When a button the valve member is depressed, a flow passageway is established which allows soap to flow from the container, thru the valve, and into the water flowing thru the wand.

1 Claim, 5 Drawing Figures

CAR HAND SPRAY WASHER

This invention relates to a device which will selectively allow a soap to be mixed with water in a hand held car washing wand.

An object of this invention is to provide a hand held car washing wand wherein a soap is mixed with water and ejected through the wand.

A further object is to provide such a device wherein either clear rinsing water, or water mixed with soap may be selectively discharged.

Other objects and advantages will be apparent from the following description.

Figure 5:
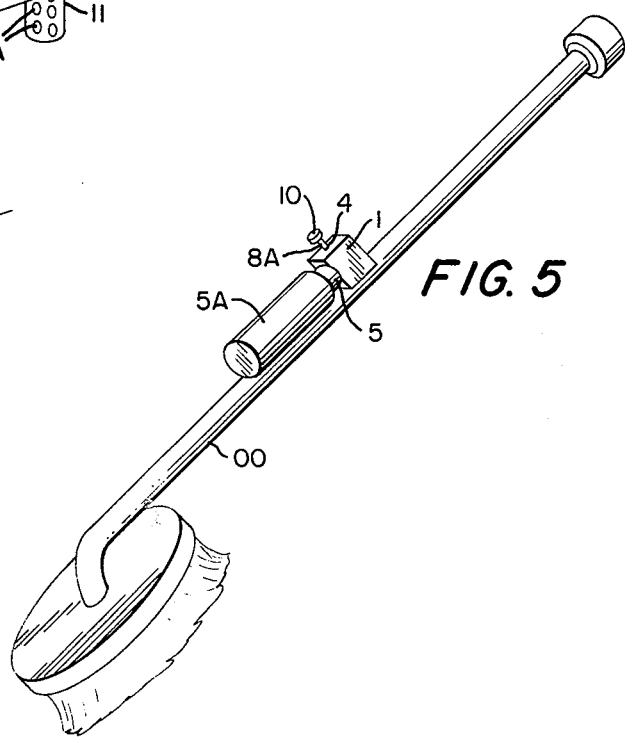
FIG. 5 is a perspective view of the invention connected to a Car Hand Spray Washer.

The invention deals with a Car Hand Spray Washer, (shown in FIG. 5), which has a wand 00 with a brush at one end and a connector at the other end for connecting the wand 00 to a source of water under pressure. The invention itself comprises a valve body 1 having a liquid soap container 5A connected to the wand 00 so that liquid soap may be allowed to flow from the container 5A into the wand 00. The valve body 1 is provided with a passageway 2, a valve chamber 3 and a cap 5 extending outwardly from the valve body 1 for holding the liquid soap container 5A Two tube guide pins 7A and 7C extend outwardly from the valve body 1 into the liquid soap container 5A, the guide pin 7A having a hole 7B near the valve body 1 for the purpose of regulating the air in the container 5A which permits the free flow of liquid soap outwardly therefrom. There is also provided a needle-like tube 6 extending outwardly from the valve body 1 into the liquid soap container for conducting the soap into the valve body 1.

Figure 1:
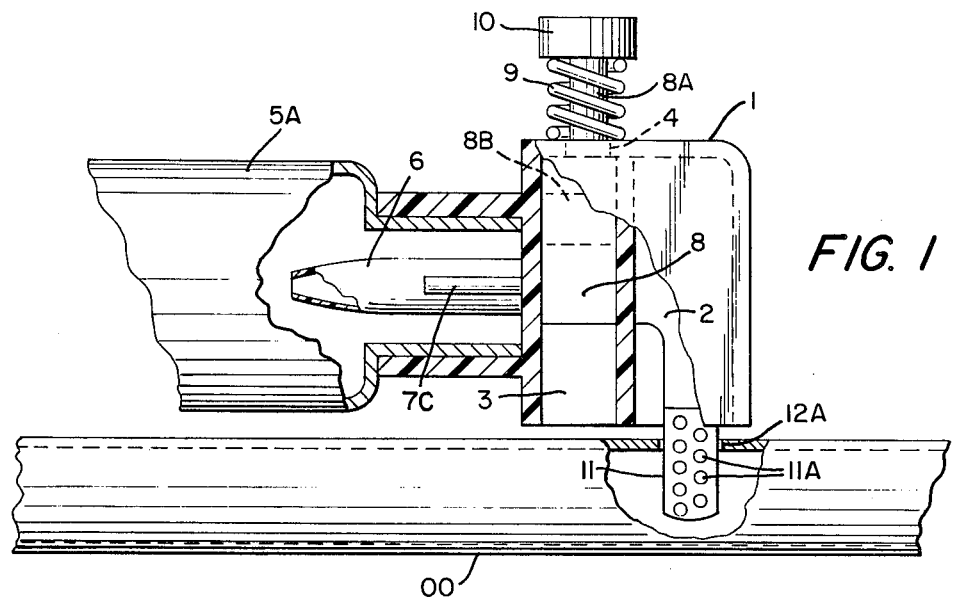
FIG. 1 is a sectional view of the invention connected to the wand to a Car Hand Spray Washer.
Figure 2:
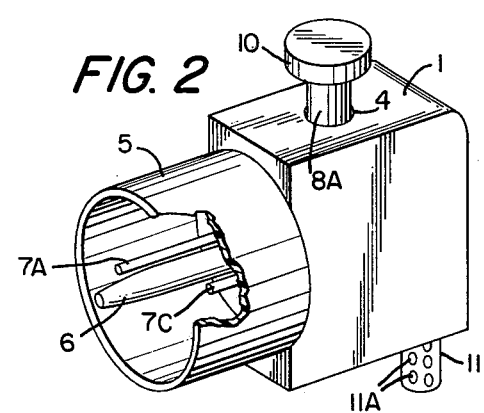
FIG. 2 is a perspective view of the invention with parts broken away.
Figure 3:
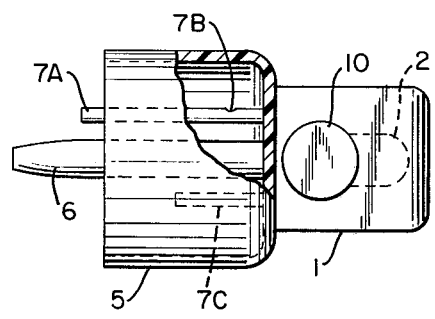
FIG. 3 is a top plan view of the invention with parts broken away.
Figure 4:
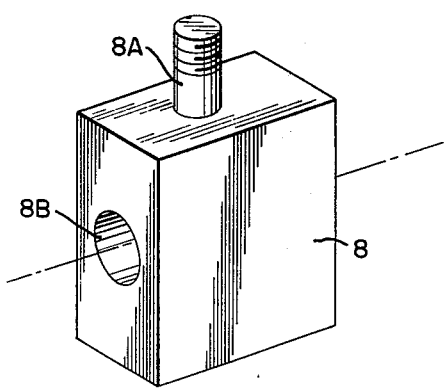
FIG. 4 is a perspective view of the valve member with the spring and button removed.

The valve chamber 3 has a hole 4 through its upper portion (FIG. 1) and is provided with a valve 8 adapted to slidingly fit in the valve chamber 3. Valve 8 is provided with a passageway 8B (FIGS. 1 and 4) therethrough in its upper portion which can be aligned with the opening in the needle-like tube 6. The valve 8 is made with a threaded shank 8A which extends through the hole 4 with a button 10 screwed on the upper portion of the shank. A spring 9 is disposed around the shank between the button 10 and the valve body 3 to bias the valve upwardly into a closed postion.

The passageway 2 is in alignment with the opening in the needle-like tube 6, spaced therefrom by the chamber 3, and then extends downwardly to the exterior of the valve body 1 where a cap 11 having holes 11A fits snugly therein, the cap extending into a hole 12A in the wand 00.

In operation, depression of the button 10 against the spring 9 aligns the passageway 8B in the valve 8 with the opening in the needle-like tube 6 and the passageway 2 permitting the liquid soap to freely flow from the container 5A through the needle-like tube 6, the passageway 8B and the passageway 2 into the cap 11 whereby the liquid soap will mix with the water flowing through the wand 00.

I claim:

1. In a spray washer of the type wherein a wand has a brush at one end and is connected to a source of water under pressure at the other end, and a liquid soap container is connected to the wand such that liquid soap flows from the container into the wand through a hole therein to mix with water flowing through the wand, the improvement comprising: a valve body connecting the liquid soap container to the wand, said valve body including: a valve chamber having aligned inlet and outlet holes and an opening through an upper portion; a cavity extending from the outlet hole to the exterior of the valve body; a valve adapted to fit slidingly in said chamber between said holes and having a passageway therethrough which can be aligned with said holes, said valve also having a threaded shank extending through said opening, a button screwed onto a threaded end of the shank, and a spring disposed on said shank between the button and the upper portion of the valve chamber; a first cap extending outwardly from said valve body for holding the liquid soap container; a needle-like tube extending outwardly from said valve body into the liquid soap container and aligned with said inlet hole; a pair of guide pins extending outwardly from said valve body into the liquid soap container, one of the pins having a hole near the valve body to regulate the air in the container permitting free flow of soap out of the container; and, a second cap snugly fit into said cavity and extending outwardly into the hole in the wand, the second cap having holes therein, whereby depression of the button against the spring aligns the passageway in the valve with the inlet and outlet holes permitting liquid soap to flow from the container through the needle-like valve, the inlet hole, the valve passageway, the outlet hole and the cavity into the second cap wherein the liquid soap is mixed with the water flowing through the wand.

* * * * *